(12) United States Patent
Krohn

(10) Patent No.: US 6,991,833 B2
(45) Date of Patent: Jan. 31, 2006

US006991833B2

(54) UV CURABLE COMPOSITIONS FOR PRODUCING MULTILAYER PAINT COATINGS

(75) Inventor: Roy C. Krohn, Fort Gratiot, MI (US)

(73) Assignee: Allied PhotoChemical, Inc., Kimball, MI (US)

( * ) Notice: Subject to any disclaimer, the term of this patent is extended or adjusted under 35 U.S.C. 154(b) by 195 days.

(21) Appl. No.: 10/148,911

(22) PCT Filed: Dec. 6, 2000

(86) PCT No.: PCT/US00/42604

§ 371 (c)(1),
(2), (4) Date: Jun. 5, 2002

(87) PCT Pub. No.: WO01/40386

PCT Pub. Date: Jun. 7, 2001

(65) Prior Publication Data

US 2003/0069324 A1    Apr. 10, 2003

Related U.S. Application Data

(60) Provisional application No. 60/169,197, filed on Dec. 6, 1999.

(51) Int. Cl.
C08J 7/04     (2006.01)
C09D 4/06     (2006.01)
C08F 2/50     (2006.01)

(52) U.S. Cl. .................. 427/514; 427/508; 427/512; 427/407.1; 522/92; 522/81

(58) Field of Classification Search ........... 427/508, 427/512, 514, 407.1; 522/92, 96, 173, 182
See application file for complete search history.

(56) References Cited

U.S. PATENT DOCUMENTS

| | | | |
|---|---|---|---|
| 3,700,754 A | 10/1972 | Schmitt et al. | |
| 3,953,643 A | 4/1976 | Cheung et al. | |
| 3,968,056 A | 7/1976 | Bolon et al. | |
| 3,988,647 A | 10/1976 | Bolon et al. | |
| 4,049,844 A | 9/1977 | Bolon et al. | |
| 4,088,801 A | 5/1978 | Bolon et al. | |
| 4,113,894 A | 9/1978 | Koch, II | |
| 4,187,340 A | 2/1980 | Oishi et al. | |
| 4,188,449 A | 2/1980 | Lu et al. | |
| RE30,274 E | 5/1980 | Bolon et al. | |
| 4,256,591 A | 3/1981 | Yamamoto et al. | |
| 4,271,212 A | 6/1981 | Stengle | |
| 4,338,376 A | 7/1982 | Kritzler | |
| 4,391,858 A | 7/1983 | Batzill | |
| RE31,411 E | 10/1983 | Bolon et al. | |
| 4,420,500 A | 12/1983 | Nakatani et al. | |
| 4,439,494 A | 3/1984 | Olson | |
| 4,455,205 A | 6/1984 | Olson et al. | |
| 4,472,019 A * | 9/1984 | Bishop et al. | ............... 385/128 |
| 4,478,876 A | 10/1984 | Chung | |
| 4,479,860 A | 10/1984 | Hayase et al. | |
| 4,495,042 A | 1/1985 | Hayase et al. | |
| 4,496,475 A | 1/1985 | Abrams | |
| 4,513,023 A | 4/1985 | Wary | |
| 4,533,445 A | 8/1985 | Orio | |
| 4,539,258 A | 9/1985 | Panush | |
| 4,547,410 A | 10/1985 | Panush et al. | |
| 4,551,361 A | 11/1985 | Burzynski et al. | |
| 4,557,975 A | 12/1985 | Moore | |
| 4,594,315 A | 6/1986 | Shibue et al. | |
| 4,640,981 A | 2/1987 | Dery et al. | |
| 4,665,342 A | 5/1987 | Topp et al. | |
| 4,666,821 A | 5/1987 | Hein et al. | |
| 4,684,353 A | 8/1987 | deSouza | |
| 4,738,899 A | 4/1988 | Bluestein et al. | |
| 4,788,108 A | 11/1988 | Saunders, Jr. et al. | |
| 4,806,257 A | 2/1989 | Clark et al. | |
| 4,814,208 A | 3/1989 | Miyazaki et al. | |
| 4,816,717 A | 3/1989 | Harper et al. | |
| 4,822,646 A | 4/1989 | Clark et al. | |
| 4,828,758 A | 5/1989 | Gillberg-Laforce et al. | |
| 4,900,763 A | 2/1990 | Kraushaar | |
| 4,911,796 A | 3/1990 | Reed | |
| 4,959,178 A | 9/1990 | Frentzel et al. | |
| 4,960,614 A | 10/1990 | Durand | |
| 4,964,948 A | 10/1990 | Reed | |
| 4,975,471 A | 12/1990 | Hayase et al. | |
| 5,006,397 A | 4/1991 | Durand | |
| 5,049,480 A | 9/1991 | Nebe et al. | |
| 5,068,714 A | 11/1991 | Seipler | |
| 5,076,963 A | 12/1991 | Kameyama et al. | |
| 5,100,848 A | 3/1992 | Enomoto et al. | |

(Continued)

FOREIGN PATENT DOCUMENTS

DE     198 35 917 A1     2/2000

(Continued)

OTHER PUBLICATIONS

Abstract, JP 4267097 A, Mitsu Toatsu Chem., Sep. 1992.*

(Continued)

Primary Examiner—Susan Berman
(74) Attorney, Agent, or Firm—Brooks Kushman P.C.

(57) ABSTRACT

The present invention discloses ultraviolet light curable paint compositions to be used in a multilayer paint coating and method for applying such a compositions to a substrate. Suitable substrates include glass, metals, and various plastics such as polycarbonates. The disclosed compositions do not contain any significant amount of volatile organic solvents that do not become incorporated in the coating or released to ambient after curing.

14 Claims, No Drawings

U.S. PATENT DOCUMENTS

| | | | | |
|---|---|---|---|---|
| 5,104,929 | A | 4/1992 | Bilkadi | |
| 5,116,639 | A | 5/1992 | Kolk et al. | |
| 5,128,387 | A | 7/1992 | Shustack | |
| 5,128,391 | A * | 7/1992 | Shustack | 522/92 |
| 5,149,971 | A | 9/1992 | McElhaney et al. | |
| 5,180,523 | A | 1/1993 | Durand et al. | |
| 5,180,757 | A | 1/1993 | Lucey | |
| 5,183,831 | A | 2/1993 | Bielat et al. | |
| 5,221,560 | A | 6/1993 | Perkins et al. | |
| 5,225,170 | A | 7/1993 | Kolk et al. | |
| 5,258,225 | A * | 11/1993 | Katsamberis | 428/331 |
| 5,282,985 | A | 2/1994 | Zabinski et al. | |
| 5,296,295 | A | 3/1994 | Perkins et al. | |
| 5,326,636 | A | 7/1994 | Durand et al. | |
| 5,356,545 | A | 10/1994 | Wayte | |
| 5,384,160 | A | 1/1995 | Frazzitta | |
| 5,395,876 | A | 3/1995 | Frentzel et al. | |
| 5,424,182 | A | 6/1995 | Marginean, Sr. et al. | |
| 5,453,451 | A | 9/1995 | Sokol | |
| 5,454,892 | A | 10/1995 | Kardon et al. | |
| 5,462,701 | A | 10/1995 | Hagemeyer et al. | |
| 5,470,643 | A | 11/1995 | Dorfman | |
| 5,470,897 | A | 11/1995 | Meixner et al. | |
| 5,514,214 | A | 5/1996 | Joel et al. | |
| 5,523,143 | A | 6/1996 | Hagemeyer et al. | |
| 5,556,527 | A | 9/1996 | Igarashi et al. | |
| 5,561,730 | A | 10/1996 | Lochkovic et al. | |
| 5,565,126 | A | 10/1996 | Kimura et al. | |
| 5,587,433 | A | 12/1996 | Boeckeler | |
| 5,596,024 | A | 1/1997 | Horie et al. | |
| 5,609,918 | A | 3/1997 | Yamaguchi et al. | |
| 5,624,486 | A | 4/1997 | Schmid et al. | |
| 5,633,037 | A | 5/1997 | Mayer | |
| 5,686,792 | A | 11/1997 | Ensign, Jr. | |
| 5,691,417 | A * | 11/1997 | Bremer et al. | 525/123 |
| 5,698,310 | A | 12/1997 | Nakamura et al. | |
| 5,716,551 | A | 2/1998 | Unruh et al. | |
| 5,718,950 | A | 2/1998 | Komatsu et al. | |
| 5,747,115 | A | 5/1998 | Howell et al. | |
| 5,750,186 | A | 5/1998 | Frazzitta | |
| 5,773,487 | A | 6/1998 | Sokol | |
| 5,784,197 | A | 7/1998 | Frey et al. | |
| 5,787,218 | A | 7/1998 | Ohtaka et al. | |
| 5,837,745 | A | 11/1998 | Safta et al. | |
| 5,866,628 | A | 2/1999 | Likavec et al. | |
| 5,871,827 | A | 2/1999 | Jaffe et al. | |
| 5,883,148 | A | 3/1999 | Lewandowski et al. | |
| 5,888,119 | A | 3/1999 | Christianson et al. | |
| 5,914,162 | A | 6/1999 | Bilkadi | |
| 5,942,284 | A | 8/1999 | Hiskes et al. | |
| 5,945,502 | A | 8/1999 | Hsieh et al. | |
| 5,950,808 | A | 9/1999 | Tanabe et al. | |
| 5,968,996 | A | 10/1999 | Sanchez et al. | |
| 5,994,424 | A | 11/1999 | Safta et al. | |
| 6,054,501 | A | 4/2000 | Taniguchi et al. | |
| 6,165,386 | A | 12/2000 | Endo et al. | |
| 6,211,262 | B1 | 4/2001 | Mejiritski et al. | |
| 6,261,645 | B1 * | 7/2001 | Betz et al. | 427/500 |
| 6,267,645 | B1 | 7/2001 | Burga et al. | |
| 6,290,881 | B1 | 9/2001 | Krohn | |
| 6,500,877 | B1 * | 12/2002 | Krohn | 522/96 |
| 6,509,389 | B1 * | 1/2003 | Krohn | 522/92 |
| 6,716,893 | B2 * | 4/2004 | Krohn | 522/92 |
| 6,784,223 | B2 * | 8/2004 | Krohn | 522/92 |
| 6,805,917 | B1 * | 10/2004 | Krohn | 427/510 |
| 6,838,177 | B2 * | 1/2005 | Fenn et al. | 428/414 |
| 6,844,029 | B2 * | 1/2005 | Okada et al. | 427/492 |

FOREIGN PATENT DOCUMENTS

| | | | |
|---|---|---|---|
| EP | 0 081 323 A1 | | 6/1983 |
| EP | 0 540 884 | * | 10/1992 |
| EP | 0 530 141 A1 | | 3/1993 |
| EP | 0 567 940 A1 | | 11/1993 |
| EP | 0 711 801 A2 | | 5/1996 |
| EP | 0 820 217 A1 | | 1/1998 |
| GB | 1 550 382 | * | 8/1979 |
| WO | WO 97/31051 | * | 8/1997 |
| WO | WO 97/45458 | | 12/1997 |
| WO | WO98/40171 | * | 9/1998 |
| WO | WO 98/47954 | | 10/1998 |
| WO | WO 98/50317 | | 11/1998 |
| WO | WO 00/62586 | | 10/2000 |

OTHER PUBLICATIONS

Abstract, JP 6016721 A, Nippon Kayaku KK, Jan. 1994.*
Derwent Abstract Corresponding To JP 5279436.
English Abstract Corresponding To Japanese Application XP-002164191.
English Abstract Corresponding To Japanese Application XP-002140477.
English Abstract Corresponding To Japanese Application XP-002140476.
English Abstract Corresponding To Japanese Application XP-002158399.

* cited by examiner

UV CURABLE COMPOSITIONS FOR PRODUCING MULTILAYER PAINT COATINGS

CROSS-REFERENCE TO RELATED APPLICATION

This application is the U.S. national phase of PCT application number PCT/US00/42604, filed Dec. 6, 2000, which further claims the benefit of U.S. provisional application Ser. No. 60/169,197, filed Dec. 6, 1999.

TECHNICAL FIELD

The present invention relates to ultraviolet light (UV) curable compositions capable of producing a multilayer paint coating.

BACKGROUND OF THE INVENTION

UV curable multilayer paint coatings are applied to a substrate through spraying, screen printing, dipping or brushing for the protection and decoration of the substrate. In the usual application, a substrate, such as metal, glass or plastic is successively coated to form at least three distinct layers, commonly referred to as the primer, base and top coat layers. As each layer is applied to the substrate, ultraviolet light is introduced to cure the layer. Multilayer paint coatings using UV curing processes offer many advantages over typical heat curable compositions.

Heat curable compositions require the use of organic solvents that contain a significant amount of volatile organic compounds (VOCs). These VOCs escape into the atmosphere while the heat curable composition dries. Such solvent based systems are undesirable because of the hazards and expense associated with VOCs. The hazards include water and air pollution and the expenses include the cost of complying with strict government regulation on solvent emission levels. In contrast, UV curable compositions contain reactive monomers instead of solvents; thus eliminating the detrimental effects of the VOCs.

Additionally, the process of heat curing typically results in coatings which suffer from poor physical properties. In the typical heat curing process, the base coat must be inordinately thick in order to hide the primer coat. Additionally, the thick base coat must be dried for a significant time to eliminate intermixing between the base coat and top coat. Due to the thickness and significant drying time of the base coat, the resulting multilayer coating suffers from low resistence to chipping and a lack of surface smoothness.

Although UV curable compositions exhibit superior properties and performance over their heat curable counterparts, UV curable compositions themselves suffer from certain disadvantages. Generally, UV curable compositions have high molecular weights and a substantial degree of cross linkage due to the highly reactive nature of the composition. As a result, many of these compositions suffer from low durability and resin shrinkage. With the use of many such compositions, an inordinately high amount of UV light is required to cure. New formulations that lessen these problems typically suffer from diminished abrasion, chemical, and scratch resistance as well as low thermal stability and adhesion.

Accordingly, there exists a need to provide environmentally safe UV curable multilayer coating paint compositions which exhibit improved appearance, weatherability, corrosion resistance and workability. Additionally, there is a need to provide a method of applying an improved composition which furthers the goal of improved performance.

SUMMARY OF INVENTION

It is an object of the present invention to provide an improved composition that upon curing by ultraviolet light produces an improved topcoat paint coating.

It is another object of the present invention to provide an improved composition that upon curing by ultraviolet light produce an improved basecoat paint coating.

It is another object of the present invention to provide an improved composition that upon curing by ultraviolet light produce an improved primer paint coating.

It is another object of the present invention to provide an improved topcoat paint composition that can be applied by spraying, screen printing, dipping, and brushing.

It is another object of the present invention to provide an improved basecoat paint composition that can be applied by spraying, screen printing, dipping, and brushing.

It is another object of the present invention to provide an improved primer paint composition that can be applied by spraying, screen printing, dipping, and brushing.

The present invention discloses ultraviolet light curable paint compositions and methods for making such compositions that may be used to produce each layer of a multilayer paint coating. The disclosed compositions do not contain any significant amount of volatile organic solvents that do not become incorporated in the layers after curing. Specifically, the paint compositions contains 5% or less volatile organic solvents by weight.

In accordance with one aspect of the invention, ultraviolet light curable paint compositions is provided. The topcoat paint composition comprises a mixture of one or more aliphatic acrylated oligomers, wherein the aliphatic acrylated oligomer mixture is present in an amount of about 20% to 30% of the topcoat composition. All percentages of each paint layer composition as expressed in this document refer to the weight percentage of the stated component to the total weight of the paint composition in its fluid state at standard temperature and pressure.

The topcoat composition preferably further comprises an acrylated epoxy oligomer in an amount of about 8% to 16%, an isobornyl acrylate monomer in an amount of about 40% to 60% of the topcoat composition, a photoinitiator in an amount of about 2% to 8% of the topcoat composition, a flow promoting agent in an amount of 0% to 6%, a UV absorber (UVA) in an amount of 1% to 3%, and a Hindered Amine Light Stabilizer (HAL) in an amount of 0.5% to 3.0%.

In accordance with another aspect of the invention, ultraviolet light curable basecoat paint compositions is provided. The basecoat paint composition comprises an aliphatic acrylated oligomer, wherein the aliphatic acrylated oligomer is present in an amount of about 3% to 25% of the basecoat paint composition. The basecoat composition preferably further comprises an acrylated epoxy oligomer in an amount of about 1% to 6%, an isobornyl acrylate monomer in an amount of about 10% to 70% of the basecoat composition, a photoinitiator in an amount of about 2% to 8% of the basecoat composition, a polyacrylic oligomer/acrylate monomer blend in an amount of 3% to 25%, a flow promoting agent in an amount of 0% to 6%, an adhesion promoter in an amount of 1% to 7%, and pigments in an amount of 7% to 30% of the basecoat composition.

In accordance with another aspect of the invention, ultraviolet light curable primer compositions is provided. The primer paint composition comprises an aliphatic acrylated oligomer, wherein the aliphatic acrylated oligomer is present in an amount of about 6% to 12% of the primer composition. The primer composition preferably further comprises an acrylated epoxy oligomer in an amount of about 2% to 10%, an isobornyl acrylate monomer in an amount of about 40% to 70% of the primer composition, a photoinitiator in an amount of about 4% to 12% of the primer composition, a polyacrylic oligomer/acrylate monomer blend in an amount of 6% to 12%, a flow promoting agent in an amount of 0% to 8%, an adhesion promoter in an amount of 2% to 8%, a UV absorber (UVA) in an amount of 1% to 3%, and a Hindered Amine Light Stabilizer (HAL) in an amount of 0.5% to 3% of the basecoat composition.

In accordance with yet another aspect of the invention, a method is provided for depositing each layer of a multilayer paint coating on a substrate. The method comprises a first step of applying to the substrate a primer composition ("primer composition"). The primer composition comprises the composition disclosed above. After the primer composition is applied to a substrate, the primer composition on the substrate is illuminated with an ultraviolet light to cause the primer composition to cure into the primer coating. The method comprises a third step of applying to the substrate a basecoat composition ("basecoat composition"). The basecoat composition comprises the composition disclosed above. After the primer composition is applied to a substrate, the basecoat composition on the substrate is illuminated with an ultraviolet light to cause the basecoat composition to cure into the basecoat coating. The method comprises a fifth step of applying to the substrate a topcoat composition ("topcoat composition"). The topcoat composition comprises the composition disclosed above. After the topcoat composition is applied to a substrate, the topcoat composition on the substrate is illuminated with an ultraviolet light to cause the topcoat composition to cure into the primer coating.

In accordance with this method, each paint layer composition can be selectively deposited on the substrate at specific locations where the paint layer plating is desired. It need not be applied to the entire substrate.

BEST MODE FOR CARRYING OUT THE INVENTION

Topcoat Compositions

Reference will now be made in detail to presently preferred compositions or embodiments and methods of the invention, which constitute the best modes of practicing the invention presently known to the inventor.

In accordance with one aspect of the invention, a presently preferred ultraviolet light curable topcoat composition ("topcoat composition") is provided. In this preferred embodiment, the topcoat composition includes an aliphatic acrylated oligomer. The aliphatic acrylated oligomer is present in an amount of about 20% to 30% of the topcoat composition. The aliphatic acrylated oligomer mixture is more preferably present in an amount of about 23% to 27%, and most preferably about 25%. The aliphatic acrylated oligomer preferably comprises one or more urethane oligomers. Suitable aliphatic acrylated oligomers include Radcure Ebecryl 244 (aliphatic urethane diacrylate diluted 10% with 1,6-hexanediol diacrylate), Ebecryl 264 (aliphatic urethane triacrylate diluted 15% with 1,6-hexanediol diacry late), Ebecryl 284 (aliphatic urethane diacrylate diluted 12% by weight with 1,6-hexanediol diacrylate) urethanes, commercially available from Radcure UCB Corp. of Smyrna, Ga.; Sartomer CN-961E75 (aliphatic urethane diacrylate blended with 25% ethoxylated trimethylol propane triacylate), CN-961H81 (aliphatic urethane diacrylate blended with 19% 2(2-ethoxyethoxy)ethyl acrylate), CN-963A80 (aliphatic urethane diacrylate blended with 20% tripropylene glycol diacrylate), CN-964 (aliphatic urethane diacrylate), CN-966A80 (aliphatic urethane diacrylate blended with 20% tripropylene glycol diacrylate), CN-982A75 (aliphatic urethane diacrylate blended with 25% tripropylene glycol diacrylate) and CN-983 (aliphatic urethane diacrylate), commercially available from Sartomer Corp. of Exton, Pa.; TAB FAIRAD 8010, 8179, 8205, 8210, 8216, 8264, M-E-15, UVU-316, commercially available from TAB Chemicals of Chicago, Ill.; and Echo Resin ALU-303, commercially available from Echo Resins of Versaille, Mo.; and Genomer 4652, commercially available from Rahn Radiation Curing of Aurora, Ill. The preferred aliphatic acrylated oligomers include Ebecryl 264 and Ebecryl 284. Ebecryl 264 is an aliphatic urethane triacrylate of 1200 molecular weight supplied as an 85% solution in hexanediol diacrylate. Ebecryl 284 is aliphatic urethane diacrylate of 1200 molecular weight diluted 10% with 1,6-hexanediol diacrylate. Combinations of these materials may also be employed herein.

This preferred topcoat composition further includes an acrylated epoxy oligomer. The acrylated epoxy oligomer is present in an amount of about 8% to 16%. The acrylated epoxy oligomer is more preferably present in an amount of about 11% to 14%, and most preferably about 13%. Suitable acrylated epoxy oligomers include Radcure Ebecryl 3603 (novolac epoxy acrylate diluted 20% by weight with tripropylene glycol diacrylate), commercially available from Radcure UCB Corp.; Sartomer CN-120 (difunctional bisphenol based epoxy acrylate) and CN-124 (difunctional bisphenol based epoxy acrylate), commercially available from Sartomer Corp.; and Echo Resin TME 9310 and 9345, commercially available from Echo Resins. The preferred acrylated epoxy oligomer is Ebecryl 3603, which is a trifunctional acrylated epoxy novolac. Combinations of these materials may also be employed herein.

The preferred topcoat composition also includes an isobornyl acrylate monomer in an amount of about 40% to 60%. The isoborny 1 acrylate monomer is more preferably present in an amount of about 45% to 55%, and most preferably about 50%. Suitable isobornyl acrylate monomers include Sartomer SR-423 (isobornyl methacrylate):

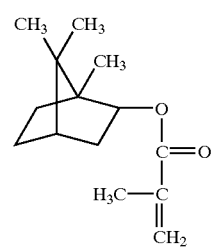

and SR-506 (isobornyl acrylate):

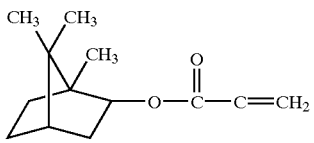

available from Sartomer Corp.; Radcure IBOA (isobornyl acrylate), commercially available from Radcure Corp.; IBOA and IBOMA, commercially available from CPS Chemical of Bradford, England; and Genomer 1121, commercially available from Rahn Radiation Curing. The preferred isobornyl acrylate monomer is Radcure IBOA, commercially available from Radcure Corp. Radcure IBOA is a high purity, low color monomer. Combinations of these materials may also be employed herein.

This preferred coat composition also includes a photoinitiator in an amount of about 2% to 8% of the topcoat composition. The photoinitiator is more preferably present in an amount of about 3% to 7%, and most preferably about 5%. If the coat composition is applied by flexographic techniques, the photoinitiator is more preferably present in an amount of about 2% to 6%, and most preferably about 4%. Suitable photoinitiators include Irgacure 184 (1-hydroxycyclohexyl phenyl ketone), Irgacure 907 (2-methyl-1-[4-(methylthio)phenyl]-2-morpholino propan-1-one), Irgacure 369 (2-benzyl-2-N,N-dimethylamino-1-(4-morpholinophenyl)-1-butanone), Irgacure 500 (the combination of 50% 1-hydroxy cyclohexyl phenyl ketone and 50% benzophenone), Irgacure 651 (2,2-dimethoxy-1,2-diphenylethan-1-one), Irgacure 1700 (the combination of 25% bis(2,6-dimethoxybenzoyl-2,4-,4-trimethyl pentyl) phosphine oxide and 75% 2-hydroxy-2-methyl-1-phenyl-propan-1-one) DAROCUR 1173 (2-hydroxy-2-methyl-1phenyl-1-propane) and DAROCUR 4265 (the combination of 50% 2,4,6-trimethylbenzoyldiphenyl-phosphine oxide and 50% 2-hydroxy 2-methyl-1-phenyl-propan-1-one) available commercially from Ciba-Geigy Corp., Tarrytown, N.Y.; CYRACURE UVI-6974 (mixed triaryl sulfonium hexafluoroantimonate salts) and CYRACURE UVI-6990 (mixed triaryl sulfonium hexafluorophosphate salts) available commercially from Union Carbide Chemicals and Plastics Co. Inc., Danbury, Conn.; and Genocure CQ, Genocure BOK, and Genocure M.F., commercially available from Rahn Radiation Curing. The preferred photoinitiator is Irgacure 1700 commercially available from Ciba-Geigy of Tarrytown, N.Y. Combinations of these materials may also be employed herein.

The composition still further includes a flow promoting agent in an amount of about 0.0% to 6%, and preferably about 4.0%, of the topcoat composition. Suitable flow promoting agents include Genorad 17, commercially available from Rahn Radiation Curing; and Modaflow, commercially available from Monsanto Chemical Co., St. Louis, Mo. The preferred flow promoting agent is Modaflow which is an ethyl acrylate and 2-ethylhexyl acrylate copolymer that improves the flow of the composition. Combinations of these materials may also be employed herein.

This preferred composition further comprises a UV absorber (UVA) in an amount of 1% to 3%, and preferably in a amount of 2%. Suitable UV absorbers include Tinuvin 328, Tinuvin 384, Tinuvin 900, Tinuvin 928, Tinuvin 1130, and Tinuvin 400 which are commercially available from Ciba-Geigy Corp., Tarrytown, N.Y.

This preferred composition further comprises a light stabilizer in an amount of 0.5% to 3%, and preferably in a amount of 1%. Suitable light stabilizers are Hindered Amine Light Stabilizers (HAL) such are Tinuvin 11 FD, Tinuvin 123, Tinuvin 144, and Tinuvin 292. These light stabilizers are commercially available from Ciba-Geigy Corp., Tarrytown, N.Y.

To illustrate, the following example sets forth a presently preferred topcoat composition according to this aspect of the invention.

EXAMPLE 1

This example provides a preferred topcoat composition according to the invention. The topcoat composition was made from the following components:

| Component | Approximate Weight % |
|---|---|
| Ebecryl 264 | 12.6 |
| Ebecryl 284 | 12.6 |
| IBOA | 50.0 |
| Irgacure 1700 | 4.9 |
| Modaflow | 4.4 |
| Ebecryl 3603 | 12.6 |
| UVA Tinuvin | 1.9 |
| HAL Tinuvin | 1.0 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, and the Ebecryl 3603 are introduced into the pan and mixed for 1 to 2 minutes at a speed of 3000 rpm. In the final step, the Tinuvin 400 and the Tinuvin 292 are introduced into the pan and mixed for 1 to 2 minutes at a speed of 5000 rpm. The temperature during mixing is monitored. The mixing is temporarily suspended if the temperature exceed 100° F.

Basecoat Compositions

In accordance with one aspect of the invention, a presently preferred ultraviolet light curable basecoat composition ("basecoat composition") is provided. In this preferred embodiment, the basecoat composition includes an aliphatic acrylated oligomers. The aliphatic acrylated oligomer is present in an amount of about 3% to 25% of the basecoat composition. In one preferred embodiment, the aliphatic acrylated oligomer mixture is more preferably present in an amount of about 4% to 7%, and most preferably about 6%. Suitable aliphatic acrylated oligomers include Radcure Ebecryl 244 (aliphatic urethane diacrylate diluted 10% with 1,6-hexanediol diacrylate), Ebecryl 264 (aliphatic urethane triacrylate diluted 15% with 1,6-hexanediol diacrylate), Ebecryl 284 (aliphatic urethane diacrylate diluted 12% by weight with 1,6-hexanediol diacrylate) urethanes, commercially available from Radcure UCB Corp. of Smyrna, Ga.; Sartomer CN-961E75 (aliphatic urethane diacrylate blended with 25% ethoxylated trimethylol propane triacylate), CN-961H81 (aliphatic urethane diacrylate blended with 19% 2(2-ethoxyethoxy)ethyl acrylate), CN-963A80 (aliphatic urethane diacrylate blended with 20% tripropylene glycol diacrylate), CN-964 (aliphatic urethane diacrylate), CN-966A80 (aliphatic urethane diacrylate blended with 20% tripropylene glycol diacrylate), CN-982A75 (aliphatic urethane diacrylate blended with 25% tripropylene glycol diacrylate) and CN-983 (aliphatic urethane diacrylate), commercially available from Sartomer Corp. of Exton, Pa.; TAB FAIRAD 8010, 8179, 8205, 8210, 8216, 8264, M-E-15, UVU-316, commercially available from TAB Chemicals of Chicago, Ill.; and Echo Resin ALU-303, commercially available from Echo Resins of Versaille, Mo.; and Genomer 4652, commercially available from Rahn Radiation Curing of Aurora, Ill. The preferred aliphatic acrylated oligomers include Ebecryl 264 and Ebecryl 284. Ebecryl 264 is an aliphatic urethane triacrylate of 1200 molecular weight supplied as an 85% solution in hexanediol diacrylate. Ebecryl 284 is aliphatic urethane diacrylate of 1200 molecular weight diluted 10% with 1,6-hexanediol diacrylate. Combinations of these materials may also be employed herein.

The preferred basecoat composition further includes a polyacrylic/acrylate blend. The polyacrylic blend is present in an amount of about 6 to 12%, and is more preferably present in an amount of about 9% of the basecoat composition. The preferred blend is Ebecryl 754 commercially available from Radcure UCB Corp. of Smyrna, Ga. Ebecryl 754 is an acrylic oligomer diluted with 30% 1,6-Hexanediol acrylate (HDODA).

This preferred basecoat composition further includes an acrylated epoxy oligomer. The acrylated epoxy oligomer is present in an amount of about 1% to 6%. In one preferred embodiment, the acrylated epoxy oligomer is more preferably present in an amount of about 3% to 5%, and most preferably about 4%. Suitable acrylated epoxy oligomers include Radcure Ebecryl 3603 (novolac epoxy acrylate diluted 20% by weight with tripropylene glycol diacrylate), commercially available from Radcure UCB Corp.; Sartomer CN-120 (difunctional bisphenol based epoxy acrylate) and CN-124 (difunctional bisphenol based epoxy acrylate), commercially available from Sartomer Corp.; and Echo Resin TME 9310 and 9345, commercially available from Echo Resins. The preferred acrylated epoxy oligomer is Ebecryl 3603, which is a tri-functional acrylated epoxy novolac. Combinations of these materials may also be employed herein.

The preferred basecoat composition also includes an isobornyl acrylate monomer in an amount of about 10% to 70%. In one preferred embodiment, the isobornyl acrylate monomer is more preferably present in an amount of about 55% to 65%, and most preferably about 60%. Suitable isobornyl acrylate monomers include Sartomer SR-423 (isobornyl methacrylate) and SR-506 (isobornyl acrylate) available from Sartomer Corp.; Radcure IBOA (isobornyl acrylate), commercially available from Radcure Corp.; IBOA and IBOMA, commercially available from CPS Chemical of Bradford, England; and Genomer 1121, commercially available from Rahn Radiation Curing. The preferred isobornyl acrylate monomer is Radcure IBOA, commercially available from Radcure Corp. Radcure IBOA is a high purity, low color monomer. Combinations of these materials may also be employed herein.

This preferred basecoat composition also includes a photoinitiator in an amount of about 2% to 8% of the basecoat composition. The photoinitiator is more preferably present in an amount of about 3% to 7%, and most preferably about 5%. Suitable photoinitiators include Irgacure 184 (1-hydroxycyclohexyl phenyl ketone), Irgacure 907 (2-methyl-1-[4-(methylthio)phenyl]-2-morpholino propan-1-one), Irgacure 369 (2-benzyl-2-N,N-dimethylamino-1-(4-morpholinophenyl)-1-butanone), Irgacure 500 (the combination of 50% 1-hydroxy cyclohexyl phenyl ketone and 50% benzophenone), Irgacure 651 (2,2-dimethoxy-1,2-diphenylethan-1-one), Irgacure 1700 (the combination of 25% bis(2,6-dimethoxybenzoyl-2,4-,4-trimethyl pentyl) phosphine oxide, and 75% 2-hydroxy-2-methyl-1-phenyl-propan-1-one), DAROCUR 1173 (2-hydroxy-2-methyl-1phenyl-1-propane) and DAROCUR 4265 (the combination of 50% 2,4,6-trimethylbenzoyldiphenyl-phosphine oxide, and 50% 2-hydroxy 2-methyl-1-phenyl-propan-1-one), available commercially from Ciba-Geigy Corp., Tarrytown, N.Y.; CYRACURE UVI-6974 (mixed triaryl sulfonium hexafluoroantimonate salts) and CYRACURE UVI-6990 (mixed triaryl sulfonium hexafluorophosphate salts) available commercially from Union Carbide Chemicals and Plastics Co. Inc., Danbury, Conn.; and Genocure CQ, Genocure BOK, and Genocure M.F., commercially available from Rahn Radiation Curing. The preferred photoinitiator is Irgacure 1700 commercially available from Ciba-Geigy of Tarrytown, N.Y. Combinations of these materials may also be employed herein.

The composition still further includes a flow promoting agent in an amount of about 0.0% to 6%, and preferably in one particular embodiment about 4.0%, of the topcoat composition. Suitable flow promoting agents include Genorad 17, commercially available from Rahn Radiation Curing; and Modaflow, commercially available from Monsanto Chemical Co., St. Louis, Mo. The preferred flow promoting agent is Modaflow which is an ethyl acrylate and 2-ethylhexyl acrylate copolymer that improves the flow of the composition. Combinations of these materials may also be employed herein.

The preferred composition still further comprises an adhesion promoter in an amount of 1% to 7%, and preferably in one particular embodiment in an amount of 4%. Suitable adhesion promoters include Ebecryl 168, commercially available from Radcure Corp.; and Sartomer CN 704 (acrylated polyester adhesion promoter) and CD 9052 (trifunctional acid ester), commercially available from Sartomer Corp. The preferred adhesion promoter is Ebecryl 168 which is a methacrylated acidic adhesion promoter. Combinations of these materials may also be employed herein.

The preferred composition still further comprises pigments in an amount of 7% to 30%, and preferably in one particular embodiment in an amount of 12%. Suitable pigments include metallic and flatbase pigments commercially available from EM Industries, Inc., Hawthorne, N.Y. Representative examples include Red ST8673, Black BB 1355, BON Maroon ST 8684, and Carbazole Violet ST8119. Suitable pigments the Afflair line of pigments commercially available from EM Industries located in Hawthorne, N.Y. Representative examples include Afflair 100, Afflair 103, Afflair 300, Afflair 507, Afflair 600, and Afflair 504.

To illustrate, the following example sets forth a presently preferred basecoat composition according to this aspect of the invention.

EXAMPLE 2

This example provides a preferred basecoat composition according to the invention. The basecoat composition was made from the following components:

| Component | Approximate Weight % |
| --- | --- |
| Ebecryl 284 | 6.2 |
| Ebecryl 754 | 6.2 |
| IBOA | 59.2 |

-continued

| Component | Approximate Weight % |
|---|---|
| Ebecryl 168 | 3.8 |
| Irgacure 1700 | 5.4 |
| Modaflow | 3.8 |
| Ebecryl 3603 | 3.8 |
| Afflair 100 | 11.6 |
| Total | 100.00 |

In this example the IBOA and Irgacure 1700 are mixed in a pan with a propeller blade mixer for 30 seconds at a speed of 500 to 1000 rpm. In the next step, the Ebecryl 754, the Ebecryl 284, the Ebecryl 3603, and Modaflow are introduced into the pan and mixed for 1 to 2 minutes at a speed of 2000 rpm. The Afflair 100 is added and mixed for 1 to 2 minutes at 2000 rpm. In the final step, the Ebecryl 168 is introduced into the pan and mixed for 1 to 2 minutes at a speed of 2000 rpm. The temperature during mixing is monitored. The mixing is temporarily suspended if the temperature exceed 100° F.

EXAMPLE 3

This example provides a preferred basecoat composition according to the invention. The basecoat composition was made from the following components:

| Component | Approximate Weight % |
|---|---|
| Ebecryl 284 | 22.0 |
| Ebecryl 754 | 22.0 |
| IBOA | 12.4 |
| Ebecryl 168 | 4.4 |
| Irgacure 1700 | 6.1 |
| Modaflow | 4.0 |
| Ebecryl 3603 | 4.0 |
| Red ST8673 | 25.1 |
| Total | 100.00 |

In this example the IBOA and Irgacure 1700 are mixed in a pan with a propeller blade mixer for 30 seconds at a speed of 500 to 1000 rpm. In the next step, the Ebecryl 754, the Ebecryl 284, the Ebecryl 3603, and Modaflow are introduced into the pan and mixed for 1 to 2 minutes at a speed of 2000 rpm. The Red ST8673 is added and mixed for 1 to 2 minutes at 2000 rpm. In the final step, the Ebecryl 168 is introduced into the pan and mixed for 1 to 2 minutes at a speed of 2000 rpm. The temperature during mixing is monitored. The mixing is temporarily suspended if the temperature exceed 100° F.

EXAMPLE 4

This example provides a preferred basecoat composition according to the invention. The basecoat composition was made from the following components:

| Component | Approximate Weight % |
|---|---|
| Ebecryl 284 | 22.0 |
| Ebecryl 754 | 22.0 |
| IBOA | 17.4 |
| Ebecryl 168 | 4.4 |
| Irgacure 1700 | 6.1 |
| Modaflow | 4.0 |
| Ebecryl 3603 | 4.0 |
| Black BB 1355 | 20.1 |
| Total | 100.00 |

In this example the IBOA and Irgacure 1700 are mixed in a pan with a propeller blade mixer for 30 seconds at a speed of 500 to 1000 rpm. In the next step, the Ebecryl 754, the Ebecryl 284, the Ebecryl 3603, and Modaflow are introduced into the pan and mixed for 1 to 2 minutes at a speed of 2000 rpm. The Black B 1355 is added and mixed for 1 to 2 minutes at 2000 rpm. In the final step, the Ebecryl 168 is introduced into the pan and mixed for 1 to 2 minutes at a speed of 2000 rpm. The temperature during mixing is monitored. The mixing is temporarily suspended if the temperature exceed 100° F.

Primer Compositions

In accordance with one aspect of the invention, a presently preferred ultraviolet light curable primer composition ("primer composition") is provided. In this preferred embodiment, the primer composition includes an aliphatic acrylated oligomer. The aliphatic acrylated oligomer is present in an amount of about 6% to 12% of the primer composition. The aliphatic acrylated oligomer mixture is more preferably present in an amount of about 7% to 10%, and most preferably about 9%. Suitable aliphatic acrylated oligomers include Radcure Ebecryl 244 (aliphatic urethane diacrylate diluted 10% with 1,6-hexanediol diacrylate), Ebecryl 264 (aliphatic urethane triacrylate diluted 15% with 1,6-hexanediol diacrylate), Ebecryl 284 (aliphatic urethane diacrylate diluted 12% by weight with 1,6-hexanediol diacrylate) urethanes, commercially available from Radcure UCB Corp. of Smyrna, Ga.; Sartomer CN-961E75 (aliphatic urethane diacrylate blended with 25% ethoxylated trimethylol propane triacylate), CN-961H81 (aliphatic urethane diacrylate blended with 19% 2(2-ethoxyethoxy)ethyl acrylate), CN-963A80 (aliphatic urethane diacrylate blended with 20% tripropylene glycol diacrylate), CN-964 (aliphatic urethane diacrylate), CN-966A80 (aliphatic urethane diacrylate blended with 20% tripropylene glycol diacrylate), CN-982A75 (aliphatic urethane diacrylate blended with 25% tripropylene glycol diacrylate) and CN-983 (aliphatic urethane diacrylate), commercially available from Sartomer Corp. of Exton, Pa.; TAB FAIRAD 8010, 8179, 8205, 8210, 8216, 8264, M-E-15, UVU-316, commercially available from TAB Chemicals of Chicago, Ill.; and Echo Resin ALU-303, commercially available from Echo Resins of Versaille, Mo.; and Genomer 4652, commercially available from Rahn Radiation Curing of Aurora, Ill. The preferred aliphatic acrylated oligomers include Ebecryl 264 and Ebecryl 284. Ebecryl 264 is an aliphatic urethane triacrylate of 1200 molecular weight supplied as an 85% solution in hexanediol diacrylate. Ebecryl 284 is aliphatic urethane diacrylate of 1200 molecular weight diluted 10% with 1,6-hexanediol diacrylate. Combinations of these materials may also be employed herein.

The preferred primer composition further includes a polyacrylic/acrylate blend. The polyacrylic blend is present in an amount of about 6 to 12%, and is more preferably present in an amount of about 9% of the primer composition. The preferred blend is Ebecryl 754 commercially available from Radcure UCB Corp. of Smyrna, Ga. Ebecryl 754 is an acrylic oligomer diluted with 30% 1,6-Hexanediol acrvlate (HDODA).

This preferred primer composition further includes an acrylated epoxy oligomer. The acrylated epoxy oligomer is present in an amount of about 2% to 10%. The acrylated epoxy oligomer is more preferably present in an amount of about 4% to 8%, and most preferably about 6%. Suitable acrylated epoxy oligomers include Radcure Ebecryl 3603 (novolac epoxy acrylate diluted 20% by weight with tripropylene glycol diacrylate), commercially available from Radcure UCB Corp.; Sartomer CN-120 (difunctional bisphenol based epoxy acrylate) and CN-124 (difunctional bisphenol based epoxy acrylate), commercially available from Sartomer Corp.; and Echo Resin TME 9310 and 9345, commercially available from Echo Resins. The preferred acrylated epoxy oligomer is Ebecryl 3603, which is a trifunctional acrylated epoxy novolac. Combinations of these materials may also be employed herein.

The preferred primer composition also includes an isobornyl acrylate monomer in an amount of about 40% to 70%. The isobornyl acrylate monomer is more preferably present in an amount of about 45% to 60%, and most preferably about 55%. Suitable isobornyl acrylate monomers include Sartomer SR-423 (isobornyl methacrylate) and SR-506 (isobornyl acrylate) available from Sartomer Corp.; Radcure IBOA (isobornyl acrylate), commercially available from Radcure Corp.; IBOA and IBOMA, commercially available from CPS Chemical of Bradford, England; and Genomer 1121, commercially available from Rahn Radiation Curing. The preferred isobornyl acrylate monomer is Radcure IBOA, commercially available from Radcure Corp. Radcure IBOA is a high purity, low color monomer. Combinations of these materials may also be employed herein.

This preferred primer composition also includes a photoinitiator in an amount of about 4% to 12% of the primer composition. The photoinitiator is more preferably present in an amount of about 6% to 10%, and most preferably about 8%. Suitable photoinitiators include Irgacure 184 (1-hydroxycyclohexyl phenyl ketone), Irgacure 907 (2-methyl-1-[4-(methylthio)phenyl]-2-morpholino propan-1-one), Irgacure 369 (2-benzyl-2-N,N-dimethylamino-1-(4-morpholinophenyl)-1-butanone), Irgacure 500 (the combination of 50% 1-hydroxy cyclohexyl phenyl ketone and 50% benzophenone), Irgacure 651 (2,2-dimethoxy-1,2-diphenylethan-1-one), Irgacure 1700 (the combination of 25% bis(2,6-dimethoxybenzoyl-2,4-,4-trimethyl pentyl) phosphine oxide, and 75% 2-hydroxy-2-methyl-1-phenyl-propan-1-one), DAROCUR 1173 (2-hydroxy-2-methyl-1-phenyl-1-propane) and DAROCUR 4265 (the combination of 50% 2,4,6-trimethylbenzoyldiphenyl-phosphine oxide, and 50% 2-hydroxy 2-methyl-1-phenyl-propan-1-one), available commercially from Ciba-Geigy Corp., Tarrytown, N.Y.; CYRACURE UVI-6974 (mixed triaryl sulfonium hexafluoroantimonate salts) and CYRACURE UVI-6990 (mixed triaryl sulfonium hexafluorophosphate salts) available commercially from Union Carbide Chemicals and Plastics Co. Inc., Danbury, Conn.; and Genocure CQ, Genocure BOK, and Genocure M.F., commercially available from Rahn Radiation Curing. The preferred photoinitiator is Irgacure 1700 commercially available from Ciba-Geigy of Tarrytown, N.Y. Combinations of these materials may also be employed herein.

The composition still further includes a flow promoting agent in an amount of about 0.0% to 8%, and preferably about 6.0%, of the topcoat composition. Suitable flow promoting agents include Genorad 17, commercially available from Rahn Radiation Curing; and Modaflow, commercially available from Monsanto Chemical Co., St. Louis, Mo. The preferred flow promoting agent is Modaflow which is an ethyl acrylate and 2-ethylhexyl acrylate copolymer that improves the flow of the composition. Combinations of these materials may also be employed herein.

The preferred composition still further comprises an adhesion promoter in an amount of 2% to 8%, and preferably in an amount of 6%. Suitable adhesion promoters include Ebecryl 168, commercially available from Radcure Corp.; and Sartomer CN 704 (acrylated polyester adhesion promoter) and CD 9052 (trifunctional acid ester), commercially available from Sartomer Corp. The preferred adhesion promoter is Ebecryl 168 which is a methacrylated acidic adhesion promoter. Combinations of these materials may also be employed herein.

This preferred composition further comprises a UV absorber (UVA) in an amount of 1% to 3%, and preferably in a amount of 2%. Suitable UVA is commercially available from Ciba-Geigy Corp., Tarrytown, N.Y.

This preferred composition further comprises a Hindered Amine Light Stablizer (HAL) in an amount of 0.5% to 3%, and preferably in a amount of 1%. Suitable HAL is commercially available from Ciba-Geigy Corp., Tarrytown, N.Y.

To illustrate, the following example sets forth a presently preferred primer composition according to this aspect of the invention.

EXAMPLE 5

This example provides a preferred primer composition according to the invention. The primer composition was made from the following components:

| Component | Approximate Weight % |
|---|---|
| Ebecryl 284 | 9.1 |
| Ebecryl 754 | 9.1 |
| IBOA | 54.0 |
| Ebecryl 168 | 5.7 |
| Irgacure 1700 | 7.8 |
| Modaflow | 5.7 |
| Ebecryl 3603 | 5.7 |
| Tiruin 400 | 1.9 |
| Tinuvin 292 | 1.0 |
| Total | 100.00 |

In this example the IBOA and Irgacure 1700 are mixed in a pan with a propeller blade mixer for 30 seconds at a speed of 500 to 1000 rpm. In the next step, the Ebecryl 754, the Ebecryl 284, the Ebecryl 3603, and the Modaflow are introduced into the pan and mixed for 1 to 2 minutes at a speed of 2000 rpm. In the final step, Ebecryl 168, the Tinuvin 400, and the Tinuvin 292 are introduced into the pan and mixed for 1 to 2 minutes at a speed of 2000 rpm. The temperature during mixing is monitored. The mixing is temporarily suspended if the temperature exceed 100° F.

Method for Depositing a Multilayer Paint Coating on a Substrate

In accordance with still another aspect of the invention, a method is provided for depositing a multilayer coating on a suitable substrate. The method comprises a first step of applying a primer composition ("primer composition") to the substrate.

The primer composition comprises the compositions described above. The preferred primer compositions according to this method are those described herein, for example, including the compositions described in example 1. The method includes a second step of illuminating the primer composition on the substrate with an ultraviolet light to cause the primer composition to cure into the primer coating. The method comprises a third step of applying to the substrate a basecoat composition ("basecoat composition"). The basecoat composition comprises the composition disclosed above. After the primer composition is applied to a substrate, the basecoat composition on the substrate is illuminated with an ultraviolet light to cause the basecoat composition to cure into the basecoat coating. The method comprises a fifth step of applying to the substrate a topcoat composition ("topcoat composition"). The topcoat composition comprises the composition disclosed above. After the topcoat composition is applied to a substrate, the topcoat composition on the substrate is illuminated with an ultraviolet light to cause the topcoat composition to cure into the primer coating.

This illumination for each layer may be carried out in any number of ways, provided the ultraviolet light or radiation impinges upon the paint composition so that the paint composition is caused to polymerize to form the coating, layer, film, etc., and thereby cures. Curing preferably takes place by free radical polymerization, which is initiated by an ultraviolet radiation source. The photoinitiator preferably comprises a photoinitiator, as described above. Various ultraviolet light sources may be used, depending on the application. Preferred ultraviolet radiation sources for a number of applications include known ultraviolet lighting equipment with energy intensity settings of, for example, 125 watts, 200 watts, and 300 watts per square inch.

Each paint composition may be applied to the substrate using a number of different techniques. The paint compositions may be applied, for example, by direct brush application, or it may be sprayed onto the substrate surface. It also may be applied using a screen printing technique. In such screen printing technique, a "screen" as the term is used in the screen printing industry is used to regulate the flow of liquid composition onto the substrate surface. The paint compositions typically would be applied to the screen as the latter contacts the substrate. The paint composition flows through the silk screen to the substrate, whereupon it adheres to the substrate at the desired film thickness. Screen printing techniques suitable for this purpose include known techniques, but wherein the process is adjusted in ways known to persons of ordinary skill in the art to accommodate the viscosity, flowability, and other properties of the liquid-phase composition, the substrate and its surface properties, etc. Flexographic techniques, for example, using pinch rollers to contact the paint composition with a rolling substrate, also may be used.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of forming a multilayer paint coating on a substrate, the method comprising:
   applying a photocurable primer composition to said substrate to form an uncured primer coating;
   curing said uncured primer coating with sufficient ultraviolet (UV) light to form a cured primer coating;
   applying a photocurable basecoat paint composition to the cured primer coating to form an uncured basecoat coating;
   curing said uncured basecoat coating with sufficient light to form a cured basecoat coating;
   applying a photocurable topcoat paint composition to the cured basecoat coating to form an uncured topcoat coating, the topcoat paint composition comprising:
   at least one aliphatic urethane acrylated oligomer present in an amount of about 20% to 30% by weight of the topcoat paint composition;
   an acrylated epoxy oligomer present in an amount of about 8% to 16% by weight of the topcoat paint composition;
   an isobornyl acrylate monomer present in an amount of about 40% to 60% by weight of the topcoat paint composition;
   a UV absorber;
   a light stabilizer; and
   a photoinitiator present in an amount of about 2% to 8% by weight of the topcoat paint composition; and
   curing said uncured topcoat coating with sufficient light to form a cured topcoat coating.

2. The method as set forth in claim 1, wherein the basecoat paint composition comprises:
   an aliphatic urethane acrylated oligomer;
   an acrylated epoxy oligomer;
   an isobornyl acrylate monomer;
   at least one pigment; and
   a photoinitiator.

3. The method as set forth in claim 2, wherein:
   the aliphatic urethane acrylated oligomer of the basecoat paint composition is present in an amount of about 3% to 25% by weight of the basecoat paint composition;
   the acrylated epoxy oligomer of the basecoat paint composition is present in an amount of about 1% to 6% by weight of the basecoat paint composition;
   the isobornyl acrylate monomer of the basecoat paint composition is present in an amount of about 50% to 70% by weight of the basecoat paint composition;
   the pigment of the basecoat paint composition is present in an amount of about 7% to 26% by weight of the basecoat composition; and
   the photoinitiator of the basecoat paint composition is present in an amount of about 2% to 8% by weight of the basecoat paint composition.

4. The method as set forth in claim 1, wherein the primer paint composition comprises:
   an aliphatic urethane acrylated oligomer;
   an acrylated epoxy oligomer;
   an isobornyl acrylate monomer;
   a UV absorber;
   a light stabilizer; and
   a photoinitiator.

5. The method as set forth in claim 4, wherein:
   the aliphatic urethane acrylated oligomer of the primer paint composition is present in an amount of about 6% to 12% by weight of the primer paint composition;

the acrylated epoxy oligomer of the primer paint composition is present in an amount of about 2% to 10% by weight of the primer paint composition;

the isobornyl acrylate monomer of the primer paint composition is present in an amount of about 40% to 70% by weight of the primer paint composition;

the UV absorber of the primer paint composition is present in an amount of about 1% to 3% by weight of the primer paint composition;

the light stabilizer of the primer paint composition is present in an amount of about 0.5% to 3% by weight of the primer paint composition; and the photoinitiator of the primer paint composition is present in an amount of about 4% to 12% by weight of the primer paint composition.

6. The method as set forth in claim 5, wherein the primer paint composition further comprises:
   an adhesion promoter; and
   a flow promoting agent.

7. The method as set forth in claim of claim 6 wherein the adhesion promoter is selected from the group consisting of:
   methacrylated acidic adhesion promoter;
   acrylated polyester adhesion promoter; and
   mixtures thereof.

8. The method of claim 1 wherein:
   the at least one aliphatic urethane acrylated oligomer of the topcoat paint composition is present in an amount of about 23% to 27% by weight of the topcoat paint composition;
   the acrylated epoxy oligomer of the topcoat paint composition is present in an amount of about 11% to 14% by weight of the topcoat paint composition;
   the isobornyl acrylate monomer of the topcoat paint composition is present in an amount of about 45% to 55% by weight of the topcoat paint composition; and
   the photoinitiator of the topcoat paint composition is present in an amount of about 3% to 7% by weight of the topcoat paint composition.

9. The method as set forth in claim 8, wherein the basecoat paint composition comprises:
   an aliphatic urethane acrylated oligomer;
   an acrylated epoxy oligomer;
   an isobornyl acrylate monomer;
   at least one pigment; and
   a photoinitiator.

10. The method as set forth in claim 9, wherein:
    the aliphatic urethane acrylated oligomer of the basecoat paint composition is present in an amount of about 3% to 25% by weight of the basecoat paint composition;
    the acrylated epoxy oligomer of the basecoat paint composition is present in an amount of about 1% to 6% by weight of the basecoat paint composition;
    the isobornyl acrylate monomer of the basecoat paint composition is present in an amount of about 50% to 70% by weight of the basecoat paint composition;
    the pigment of the basecoat paint composition is present in an amount of about 7% to 26% by weight of the basecoat composition; and
    the photoinitiator of the basecoat paint composition is present in an amount of about 2% to 8% by weight of the basecoat paint composition.

11. The method as set forth in claim 8, wherein the primer paint composition comprises:
    an aliphatic urethane acrylated oligomer;
    an acrylated epoxy oligomer;
    an isobornyl acrylate monomer;
    a UV absorber;
    a light stabilizer; and
    a photoinitiator.

12. The method as set forth in claim 11, wherein:
    the aliphatic urethane acrylated oligomer of the primer paint composition is present in an amount of about 6% to 12% by weight of the primer paint composition;
    the acrylated epoxy oligomer of the primer paint composition is present in an amount of about 2% to 10% by weight of the primer paint composition;
    the isobornyl acrylate monomer of the primer paint composition is present in an amount of about 40% to 70% by weight of the primer paint composition;
    the UV absorber of the primer paint composition is present in an amount of about 1% to 3% by weight of the primer paint composition;
    the light stabilizer of the primer paint composition is present in an amount of about 0.5% to 3% by weight of the primer paint composition; and
    the photoinitiator of the primer paint composition is present in an amount of about 4% to 12% by weight of the primer paint composition.

13. The method as set forth in claim 12 wherein the primer paint composition further comprises:
    an adhesion promoter; and
    a flow promoting agent.

14. The method as set forth in claim of claim 13 wherein the adhesion promoter is selected from the group consisting of:
    methacrylated acidic adhesion promoter;
    acrylated polyester adhesion promoter; and
    mixtures thereof.

* * * * *